Figure 1:
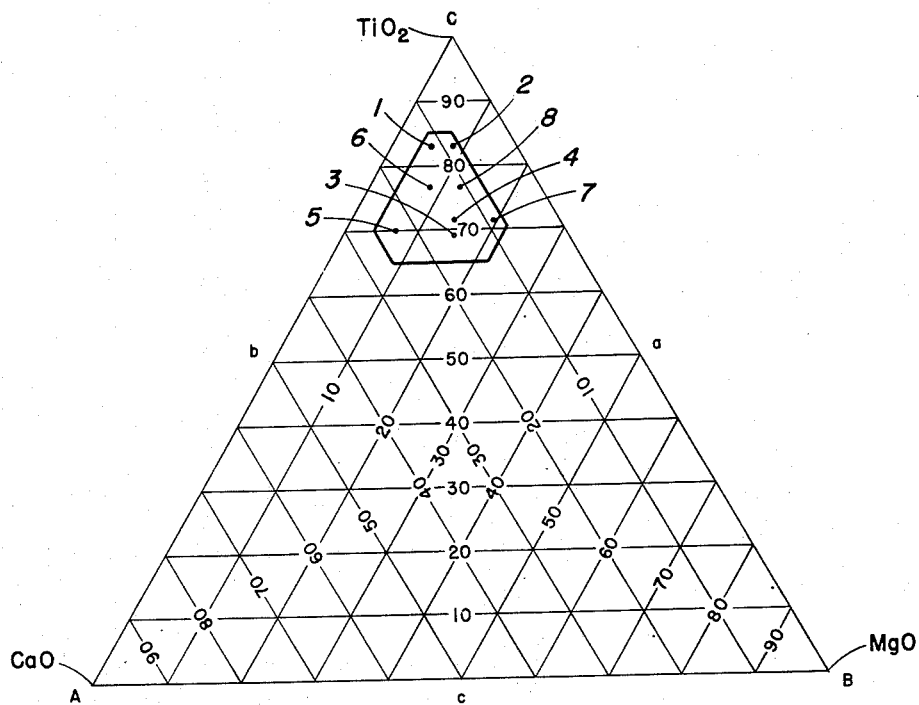

March 17, 1953 S. S. COLE 2,631,941
TITANIUM CONCENTRATES
Filed May 17, 1949 2 SHEETS—SHEET 1

Ternary Diagram
CaO-MgO-TiO₂

Fig. I.

INVENTOR
Sandford S. Cole
BY
Charles F. Kaegebehn
ATTORNEY

INVENTOR
Sandford S. Cole

Patented Mar. 17, 1953

2,631,941

UNITED STATES PATENT OFFICE 2,631,941

TITANIUM CONCENTRATES

Sandford S. Cole, Metuchen, N. J., assignor to National Lead Company, New York, N. Y., a corporation of New Jersey Application May 17, 1949, Serial No. 93,752

2 Claims. (Cl. 106—51)

This invention relates to titaniferous compositions of matter which react readily with strong mineral acids, particularly sulphuric acid, and to methods for preparing the same.

Industrial processes for the preparation of titanium dioxide pigments depend, in the first instance, upon a reaction between an iron-containing titaniferous material, ilmenite ore, and strong sulphuric acid. By means of this reaction which, in the trade, is generally termed "digestion" or "attack" the titanium and iron values, among others, are solubilized. The iron values play no important role in the process and are almost invariably removed after dissolution, as by crystallization. However, in the digestion reaction, they consume valuable acid which adds to the cost of producing the finished pigment. Consequently, interest has developed in titaniferous compositions which contain a higher proportion of titanium than is usually present in ilmenite and relatively lower proportions of constituents like iron which consume valuable acid. The present invention provides methods for the preparation of novel titaniferous compositions which because of ready digestibility in strong sulphuric acid and relatively high titanium content are especially suited for the economical preparation of titanium dioxide pigments.

The principal object of the present invention is, therefore, the preparation of compositions or concentrates rich in titanium and relatively poor in iron, which are readily digestible in strong sulphuric acid. Another object of the present invention is the preparation of readily digestible compositions which at elevated temperature, flow freely. These and other objects of the invention will be apparent from the following description:

The compositions of the present invention are characterized broadly first as being readily digestible in strong sulphuric acid, the term "readily digestible" being hereinafter defined, second, as having a small content of unreduced iron (iron oxide, FeO) but appreciably less total iron than contained in the original titaniferous iron starting material and, third, as being free from over about 15% by weight of glass forming impurities referred to a "gangue."

For the purposes of the present invention, the term "readily digestible" indicates a composition which, when subjected to a test, the conditions of which are about to be described, gives a yield of solubilized titanium, calculated as $TiO_2$, of at least 80% of the total titanium content ($TiO_2$ basis) of the composition.

TEST FOR DIGESTIBILITY

Ten grams of comminuted titaniferous material of fineness such as to pass through a 325 mesh screen are heated in an oven to 100° C. Sulphuric acid of at least 85% strength, in an amount sufficient theoretically to combine with all base-forming elements e. g. FeO, MgO, CaO, in the material and, in addition to provide a ratio of $H_2SO_4$ to $TiO_2$ of 2.0 (assumed 96% solubilization of all reactable constituents) is weighed into a large test tube, for instance, a 150 x 25 mm. size. The acid is heated in the test tube, preferably by means of a sand bath, up to 150° C. to 170° C. The hot comminuted titaniferous material is then quickly poured into the heated acid and the whole is thoroughly mixed. Reaction starts promptly and the temperature rises rapidly 30°–50° C., and then slowly falls. When the digestion mass in the test tube begins to thicken, the test tube is placed in an oven at 170°–190° C. and left there for 2 hours in order to "dry out" or "cure" the digestion cake. The cured cake is then dissolved in water or weak sulphuric acid the content of dissolved $TiO_2$ determined by conventional analytic procedures.

The titaniferous compositions described in the appended claims as "digestible in strong sulphuric acid" when subject to the foregoing test will show yields of solubilized $TiO_2$ of at least 80%. Preferred compositions will give yields of 90% and higher.

Compositions having the foregoing characteristics are obtained according to the invention by heating a titaniferous-iron starting material for instance, ilmenite ore, under reducing conditions at temperatures between 1150° C. and about 1600° C. until a major portion, but not all, of the iron content thereof is reduced to metallic state, and thereafter separating metallic iron from the resultant product, to obtain a residue rich in titanium but containing a small amount of unreduced iron oxide. As desired, fluxes and addition agents may be admixed with the titaniferous iron starting material to impart other favorable characteristics for instance, fluidity, as hereinafter explained.

More particularly, the compositions of the present invention are characterized by having a content of unreduced iron oxide, FeO, of at least 1% and preferably between about 1% and about 10% by weight, a content of at least 50% of crystalline material having the crystal lattice structure of iron magnesium dititanate as determined by X-ray analysis, and less than 15% by weight of glass-forming impurities.

By "material having the crystal lattice structure of magnesium dititanate" is meant any compound regardless of chemical composition which when exposed to X-rays exhibits the characteristic diffraction pattern of magnesium dititanate; lattice structure refers to the internal arrangement of the ions which make up compound whether or not it possesses a well-defined external crystalline form or shape. In the compositions of the present invention, the material having the crystal lattice structure of magnesium dititanate may consist, in fact, of substantially pure magnesium dititanate represented by the formula $MgO \cdot 2TiO_2$; it may consist of magnesium dititanate in which a part of the magnesium is isomorphously replaced by iron as represented by the formula $(Fe, Mg)O \cdot 2TiO_2$, or consist substantially completely of iron dititanate $FeO \cdot 2TiO_2$. The characteristic X-ray pattern of magnesium dititanate is shown in Table I below and the percentage of the structure present in a composition of this invention may be conveniently determined, as is well known, by comparison of the relative intensity of the lines of a sample with the intensity of corresponding lines shown by a sample of known composition. The material of this structure may also contain $TiO_2$ in solid solution without influencing the characteristic effect thereof and the percentage of magnesium dititanate structure referred to will include the $TiO_2$ in solid solution therewith. With $TiO_2$ in solid solution, the general X-ray pattern is retained but a slight shift of the line position is observed due to the larger interplaner spacings of the crystal lattice. The degree in shift depends upon the amount of $TiO_2$ taken into solid solution and increases with increased amounts of $TiO_2$.

TABLE I

*X-ray diffraction pattern of magnesium dititanate, $MgO \cdot 2TiO_2$*

Å. U. 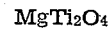

| d/n | Rel. Intensity |
|---|---|
| 5.0 | .12 |
| 4.9 | .12 |
| 3.51 | 1.00 |
| 2.75 | .6 |
| 2.45 | .2 |
| 2.42 | .15 |
| 2.22 | .15 |
| 2.19 | .2 |
| 1.967 | .3 |
| 1.876 | .6 |
| 1.846 | .15 |
| 1.754 | .15 |
| 1.655 | .15 |
| 1.634 | .2 |
| 1.551 | .3 |
| 1.535 | .2 |
| 1.424 | .09 |
| 1.378 | .08 |
| 1.358 | .15 |
| 1.318 | .08 |
| 1.265 | .1 |
| 1.245 | .1 |

In order to preserve the desired ready digestibility, it has been found that the titaniferous compositions of the present invention should contain only a relatively minor amount of what may be regarded as reduced magnesium titanate which corresponds to the formula $MgTi_2O_4$ and possesses a cubic or block-like crystal form. This material is, itself, not digestible and when present in the titaniferous composition in amounts substantially above about 15% destroys the digestibility of the composition. This reduced magnesium titanate is formed from the desired magnesium dititanate as a result of heating under reducing conditions prolonged beyond a desired point. With prolonged heating, under reducing conditions, the magnesium dititanate structure, $MgO \cdot 2TiO_2$ is apparently converted to an intermediate composition, representable by the formula, $MgTi_3O_6$ without loss of crystal form or ready digestibility. However, as heating continues, the lath-like crystals break down in cubic or block-like forms of a composition representable by the formula, $$MgTi_2O_4$$

hereinafter referred to as reduced magnesium titanate, the presence of which is undesirable in the compositions of the present invention. It is to be understood in the explanation above that the material referred to as magnesium dititanate may be this compound or material having the structure of magnesium dititanate in which the magnesium is partially or even wholly replaced by iron.

Thus it will be seen, that the titaniferous compositions of the present invention have to be free from such an amount of the undesirable reduced magnesium titanate as will render the compositions not readily digestible; that is to say, possessing a digestibility as determined by the test above described of less than about 80%. The tolerable upper limit of the reduced magnesium titanate, $MgTi_2O_4$ has been established as about 15% of the composition, as determined by microscopic analysis. Such analysis, as is known, is made by a skilled operator who determines the percentage of the total area of the field occupied by the reduced magnesium titanate. In this type of analysis, there is always a certain variation as between operators, and the figure 15% may vary plus or minus a few per cent. However, when the digestibility of the composition is within the criteria of the invention, i. e. at least 80%, the composition will not contain over a tolerable amount of reduced magnesium titanate.

Depending upon the temperature at which the reduction is carried out within the range 1150° C. to about 1600° C., there will be obtained materials which may be roughly grouped into three classes: (1) materials consisting of discrete, non-sintered particles; (2) sintered masses, and: (3) typical slag-like materials. The temperature demarcations within which these three classes of compositions are obtained are not sharp, rather the transition from discrete, non-sintered material to the slag-like materials is a continuum. However, it may be stated that between 1150° C. and about 1200° C. discrete, non-sintered particles predominate; between about 1350° C. and about 1600° C. slag-like material is formed; while at temperatures between about 1200° C. and about 1350° C. sintered masses are obtained but sometimes because of the type of impurities present in the ore and the modifications employed in the process sintered masses may be also obtained at temperatures somewhat lower than 1200° C. and somewhat higher than 1350° C.

The starting material for the preparation of concentrates of the present invention is a material containing iron and titanium, preferably ilmenite ore in comminuted form.

This is mixed with a carbonaceous reducing agent, powdered carbon, coke or coal. When operating in the higher temperature ranges, that is, from about 1350° C. to 1600° C., suitable fluxing agents, preferably comprising magnesium oxide and/or calcium oxide may be employed in the starting mixture to produce slag compositions which are fluid and from which the molten iron may be separated by tapping. The mixture, with or without fluxes is heated in a suitable furnace and the iron content in the mixture is reduced to metallic state to an extent such that at least 1% by weight of iron oxide, FeO, based on the combined weight of the constituents other than metallic iron remains in the mixture. It is preferred to continue the reduction to an extent such that between 1% and 10% iron oxide remains. In the case of the high temperature operation, the molten iron migrates to the bottom of the reaction mass to form a deposit or pool of molten iron, and when suitable fluxes are employed, the slag will be fluid and readily separated therefrom. So-formed titanium rich slags which are the preferred compositions of the present invention have in general a viscosity of less than one poise and for the most part less than 1 poise or about 1.6 poise. In the case of sintering temperatures, which may be from about 1200° C. to about 1350° C., the reduction is carried on to the same degree resulting in a residual, not less than 1% FeO in the concentrate composition and the reduced mixture may be puddled to separate the metallic iron or this may be accomplished by grinding followed by magnetic separation or the reduced mixture may be leached to solubilize the metallic iron. In the case of low temperature operation, that is, generally between 1150° C. and about 1200° C., the concentrate is obtained in the form of discrete particles. The reduction is, as before, carried on to an extent such that not less than 1% of iron oxide and preferably from 1 to 10% calculated as a percentage of the constituents other than metallic iron. In this case, however, the metallic iron is found in the skeletal structure of the particles which may subsequently be crushed and the iron separated chemically by treatment with a suitable solvent such as sulphuric acid or ferric chloride.

The presence of a minor amount of iron oxide in the concentrate composition serves to insure against the formation of the undesirable reduced magnesium titanate, MgTi$_2$O$_4$. It has been found that before reduction of the desirable magnesium dititanate, MgO.2TiO$_2$ begins, substantially all the iron oxide has been reduced to the metallic state. Thereafter, reduction of the magnesium dititanate proceeds. Theoretically, it should be possible to carry out the heat-treatment until all of the iron oxide is reduced without forming excessive reduced magnesium titanate, but, in practice, this is not possible. Primarily, this is due to the fact that it has never been found possible to maintain absolutely uniform conditions throughout the furnace batch during the heat treatment. Hence, the reduction process will be further advanced in certain sections of the furnace than in others so that in some sections magnesium dititanate may be undergoing reduction to the reduced magnesium titanate while in some other sections, the iron oxide has not yet been reduced. It has been found, however, that when the slag compositions contain between about 1% and 10% of unreduced iron oxide, FeO, based on the weight of the slag, no excess reduction of the magnesium dititanate will have occurred. Since, in practical operation, some small amount of residual reduced metallic iron will often remain in the slag, the amount of unreduced iron oxide, FeO, is calculated as a percentage of the combined weight of the constituents of the slag other than metallic iron. This small amount of iron is present in the magnesium dititanate crystal structure isomorphously replacing magnesium, which may be represented by the formula (Fe,Mg)O.2TiO$_2$.

A simple means of achieving the incomplete reduction of the iron oxide is to employ an amount of carbonaceous reducing agent less than that which would be theoretically required to reduce all the iron oxide.

However, it may be found necessary when operating on a large scale, in order to cut down furnace erosion, to employ a furnace lined with carbon; and when an electric arc furnace is used, carbon electrodes will be used. It was found that the carbon of the furnace lining and of the electrodes tend to enter into the reaction as a reducing agent. It is, therefore, desirable to take this secondary reducing effect into account when carrying out the reduction of the iron in such furnaces. Thus, the amount of carbonaceous reducing agent mixed with the starting material may be decreased by an amount sufficient to compensate for the carbon which will enter into reaction from the furnace lining and electrodes. When an electric arc furnace is employed, the degree of reduction of the iron oxide can be regulated by controlling the electrical energy supplied to the furnace. Depending upon the conditions of operation and the equipment to be used, those skilled in the art can readily determine the most effective manner of carrying out the incomplete reduction of the iron oxide.

It has also been found that when the invention is operated on a small scale using initial reaction mixtures of only 300–400 grams, such as would be the case in laboratory practice, the minimum iron oxide content of the slag composition required for ready digestibility can be as low as about 1.0%, FeO. This is so because under laboratory conditions, it is possible to maintain substantially constant and uniform conditions of reaction throughout the reaction mixture during the heating. Under these conditions, the presence of even as little as 1.0% unreduced iron oxide indicates freedom from undesirable amounts of reduced magnesium titanate.

Excess of such iron may be present without deleterious effects. However, contents of unreduced iron oxide above about 10% should be avoided for economical reasons, since in digestion, this excess iron will take up an equivalent amount of expensive strong sulphuric acid, and introduce problems of subsequent disposal of iron sulphate.

The preferred mode of operation of the present invention is to employ the upper range of temperatures for reduction that is, between about 1350° and about 1600° C. While digestible concentrates may be obtained from reduction at this temperature without addition of fluxes, it is preferred to add magnesium oxide and calcium oxide to form relatively free-flowing slag concentrate products. In cases where no fluxes are employed, the digestibility is not adversely affected if the limiting requirements as to content of magnesium dititanate structure, residual FeO and the amount of gangue present are met. However, the concentrate is more difficult to separate from the reduced metallic iron in commercial adaptations of the invention and therefore a slag composition will generally be found to be more desirable. Accordingly the preferred mode of operation involves the addition of calcium oxide and magnesium oxide to the ore together with reducing agent to form the starting mixture. These agents should be admixed with the starting material in amounts so that for every 100 parts of titanium, calculated as $TiO_2$ in the starting material, there will be present in the reaction mixture from about 18 parts to about 54 parts of magnesium MgO, and lime, CaO, taken together. Within these 18 to 54 parts the MgO may vary from about 4 parts to about 34 parts, and the CaO may vary from about 10 parts to about 40 parts. Obviously, the lime and magnesium need not be added as relatively pure compounds, but a dolomitic limestone containing both lime and magnesia may be used. Furthermore, in calculating the amount of these ingredients to be used, any amounts present in the titaniferous-iron starting material, e. g. ilmenite, are naturally taken into account. Considering the $TiO_2$, MgO, and CaO present in the starting mixture as a three component system, the proportions of each should be such that the percentage composition will be represented by a point lying within the shaded area ABCDEF on the trilinear diagram annexed hereto and designated, Fig. 1. It will be seen by reference to this diagram that the percentage of the components $TiO_2$, MgO, and CaO may vary within the following limits:

$TiO_2$ from 65% to 85%
MgO from 4% to 22%
CaO from 8% to 26%

While proportions of the three components of the starting mixture which fall within the entire enclosed area of Fig. 1 will give freely-flowing, readily-digestible slag compositions, rich in titanium as contemplated by the preferred embodiment of the invention, it is further preferred to operate within the upper portion of the shaded area with theoretical titanium contents between about 80% and about 85% in the three component system so that the highest concentration of $TiO_2$ will be present in the final composition. The $TiO_2$ in the composition will be combined with the calcium to form calcium titanate; with the magnesium to form magnesium dititanate, possibly some intermediate magnesium titanate of the composition, $MgTi_3O_6$, and possibly some undesired reduced magnesium titanate, $MgTi_2O_4$, and as $TiO_2$ in solid solution in the lath-like crystal structure of the magnesium dititanate.

Figure 2:

Fig. 2 is a photomicrograph, taken at 500 diameters of a typical preferred slag composition of the present invention. In Fig. 2 the gray elongated, lath-like crystals are of magnesium dititanate structure. This lath-like form persists when magnesium replaces iron isomorphously in the crystal structure and also when titanium oxide is held in solid solution. The light crystals of irregular shape which show high reflectance are calcium titanate. The dark background is the matrix of siliceous, glass-like structure referred to as gangue.

Figure 3:

Fig. 3 is a photomicrograph also taken at 500 diameters of a typical slag composition in which the iron oxide content has been reduced below the desirable minimum and the magnesium dititanate structure has to a large extent been replaced by the undesirable reduced magnesium dititanate structure resulting in formation of a composition which is not readily digestible. In Fig. 3, the large grey areas at the right and left hand edges are of residual magnesium dititanate structure. The darker grey cubic or block-like crystals are of the undesirable reduced magnesium dititanate structure. Calcium titanate appears as the irregular light highly reflective crystals while the dark background is siliceous gangue as in Fig. 2.

For purposes of comparison, Table II gives the chemical composition and microscopic analysis of the digestible composition shown in Fig. 2 as compared with the undigestible compositions shown in Fig. 3.

TABLE II

|  | Composition of Fig. 2 | Composition of Fig. 3 |
|---|---|---|
| Chemical Analysis: | Percent | Percent |
| Metallic Fe | .60 | .60 |
| Total Fe | 2.2 | 1.4 |
| Fe++ | 1.6 | 0.8 |
| Ti+++ | 1.2 | 8.2 |
| $TiO_2$ | 70.5 | 70.7 |
| Microscopic Analysis: |  |  |
| Material having the structure of magnesium dititanate, $MgO.2TiO_2$ | 60–65 | 20–30 |
| $MgTi_2O_4$ (reduced Mg Titanate) |  | 30–40 |
| $CaO.TiO_2$ | 20–25 | 15–20 |
| Glassy phase (gangue) | 15 | 15–20 |
| Fe, FeS, etc. | ±5 | ±5 |
| Digestibility | 81 | (¹) |

¹ Less than 60.

In both Fig. 2 and Fig. 3, the presence of calcium titanate is shown. This constituent is formed during the preparation of the composition and imparts fluidity which is desirable in order to remove the composition from the reaction vessel in which it is prepared. However, the calcium titanate does not contribute to or detract from ready digestibility, and hence, strictly speaking, readily digestible compositions of the present invention need not contain calcium titanate. The preferred composition, however, will be found to contain calcium titanate, since it is desirable that the composition be both fluid and readily digestible.

Where, as is the case when a titaniferous-iron starting material, such as ilmenite, is used in the practice of the invention, impurities which are contained in the starting material may be present in the reaction mixture. Such impurities are generally referred to as gangue and may consist principally of silica, $SiO_2$ with other compounds such as zirconia, $ZrO_2$, chromium and vanadium oxides, $Cr_2O_3$ and $V_2O_5$, alumina, $Al_2O_3$, etc. These impurities exert no appreciable effect on the course of the reaction of the present invention and will be found in the titanium-rich slag composition as a vitreous or glass-like matrix, as shown in Figs. 2 and 3 as the dark background or matrix in which the titanium compounds formed during the reaction are dispersed.

In this connection, it should be noted that the vitreous or glass-like phase, considered gangue, if present in excess amount, tends to reduce digestibility by surrounding and thus protecting the particles of digestible material from attack by sulphuric acid. Accordingly, in practicing the invention, the total amount of gangue present in the reaction mixture should not be more than will produce glass-like phase in excess of about 15% of the slag, by weight. If the raw material, e. g. ilmenite, contains an excess of glass-forming ingredients it may be found necessary to subject the material to a preliminary separation, for instance, a froth-flotation treatment prior to the slagging operation.

In order to more fully illustrate the present invention the following examples are presented to show typical operations employed at the various temperatures of reduction to obtain digestible titanium concentrates:

Examples 1–10 represent the class of concentrates (the preferred group) formed at reduction temperatures between about 1350° C. and about 1600° C. which are heretofore designated as slag-like materials; Example 11 represents the class of concentrates formed at reduction temperature between about 1200° C. and about 1350° C. which are designated as sintered masses; while Example 12 represents the class of concentrates formed at reduction temperatures between 1150 and about 1200° C. which are designated as discrete and non-sintered material.

*Example 1*

Illustrating method of producing a slag composition with high $TiO_2$ content using a minimum amount of fluxing agents, MgO and CaO, and an ore possessing low gangue/$TiO_2$ ratio.

The ilmenite-containing ore had the following analysis:

| Constituent | Percentage |
|---|---|
| $TiO_2$ | 59.9 |
| Fe Oxides | 34.5 |
| CaO | .1 |
| MgO | 0.9 |
| Gangue | 4.6 |

24.9 grams of CaO, 9.3 grams of MgO and 36 grams of carbon (petroleum coke) were mixed with 300 grams of the ilmenite. The charge was heated to a temperature of about 1450° C. in an induction furnace and held in a molten state until by analysis it was found that the unreduced iron oxide, FeO, content of the slag, was reduced to 4.5%. The slag which was a very thin fluid when separated from the molten metal by tapping had the following chemical analysis:

| Constituent | Percentage |
|---|---|
| $TiO_2$ | 76.5 |
| FeO | 4.5 |
| CaO | 10.7 |
| MgO | 5.1 |
| Gangue | 3.2 |
| Material having the structure of magnesium dititanate, $MgO.2TiO_2$ | 70 |

When tested for digestibility in the manner described above, the solubilized $TiO_2$ was found to be 97%.

Plotting this example on the ternary diagram, Fig. 1, the proportions in the three component system, CaO—MgO—$TiO_2$, are equivalent to the following theoretical composition, and are designated by point No. 1:

| Constituent | Percentage |
|---|---|
| $TiO_2$ | 83.0 |
| CaO | 11.5 |
| MgO | 5.5 |

*Example 2*

Illustrating method of producing a slag composition with a high $TiO_2$ content using a minimum amount of fluxing agents and an ore possessing a relatively high gangue/$TiO_2$ ratio.

The ilmenite-containing ore had the following analysis:

| Constituent | Percentage |
|---|---|
| $TiO_2$ | 39.7 |
| Fe Oxides | 49.2 |
| CaO | 0.7 |
| MgO | 3.6 |
| Gangue | 6.8 |

12 grams of CaO, 4 grams of MgO and 60 grams of carbon (petroleum coke) were mixed with 400 grams of ilmenite described above. The charge was heated according to Example 1. The slag had the following chemical analysis:

| Constituent | Percentage |
|---|---|
| $TiO_2$ | 71.0 |
| FeO | 2.8 |
| CaO | 6.6 |
| MgO | 8.2 |
| Gangue | 11.4 |
| Material having the structure of magnesium dititanate, $MgO.2TiO_2$ | 70 |

The digestibility of the $TiO_2$ was found to be 93%.

Plotting this example on the ternary diagram, Fig. 1, the proportions in the three component system, CaO—MgO—$TiO_2$, are equivalent to the following theoretical composition and are designated by point No. 2.

| Constituent | Percentage |
|---|---|
| $TiO_2$ | 82.9 |
| CaO | 8.0 |
| MgO | 9.1 |

*Examples 3 and 4*

Illustrating method of producing a slag composition with a relatively low content of $TiO_2$ to show the lower $TiO_2$ ranges covered by this invention with both high and low gangue/$TiO_2$ ratios.

The same ores as were used in Examples 1 and 2 were now processed in the manner described under Example 1 with various amounts of the fluxing agents as set forth below to produce slag compositions with relatively low $TiO_2$ contents. The amounts of fluxing agents and the results obtained are recorded as follows:

| | Example 3 | Example 4 |
|---|---|---|
| Type of ore used (gangue/$TiO_2$ ratio) | low | high |
| Amount of ore used (grams) | 300 | 400 |
| Amount of fluxing agents added: | | |
|   CaO (g.) | 40 | 28 |
|   MgO (g.) | 37.6 | 16 |
| Analysis (chemical) of slag produced: | | |
|   $TiO_2$ (percent) | 65.9 | 59.5 |
|   FeO (percent) | 1.4 | 3.9 |
|   CaO (percent) | 14.7 | 11.5 |
|   MgO (percent) | 14.7 | 11.4 |
|   Gangue (percent) | 3.3 | 13.7 |
| Material having the structure of magnesium dititanate, $MgO.2TiO_2$ | 60 | 55 |
| Digestibility (percent) | 93 | 92 |
| Theoretical composition (CaO—MgO—$TiO_2$ System): | | |
|   $TiO_2$ (percent) | 69.2 | 71.8 |
|   CaO (percent) | 15.4 | 14.1 |
|   MgO (percent) | 15.4 | 14.1 |
| Designation number on Fig. 1 | 3 | 4 |

*Examples 5 and 6*

Illustrating low MgO and high CaO additions as fluxes with both types of ores.

The same procedure as previously described was used for these two examples. The amounts of the fluxing agents and the results obtained are set forth as follows:

|  | Example 5 | Example 6 |
|---|---|---|
| Type of ore used (gangue/TiO$_2$ ratio) | low | high |
| Amount of ore used (grams) | 300 | 400 |
| Amount of fluxing agents added: |  |  |
| CaO (g.) | 59 | 28 |
| MgO (g.) | 15 | 4 |
| Analysis (chemical) of slag produced: |  |  |
| TiO$_2$ (percent) | 65.2 | 61.0 |
| FeO (percent) | 3.5 | 5.9 |
| CaO (percent) | 21.2 | 11.8 |
| MgO (percent) | 6.5 | 7.1 |
| Gangue (percent) | 3.6 | 14.2 |
| Material having the structure of magnesium dititanate, MgO.2TiO$_2$ | 50 | 60 |
| Digestibility (percent) | 94 | 90 |
| Theoretical Composition (CaO—MgO—TiO$_2$ system): |  |  |
| TiO$_2$ (percent) | 70.0 | 76.3 |
| CaO (percent) | 23.0 | 14.9 |
| MgO (percent) | 7.0 | 8.8 |
| Designation number on Fig. 1 | 5 | 6 |

Examples 7 and 8

Illustrating high MgO and low CaO additions and fluxes with both types of ores.

The same procedure as previously described was used in these examples. The results are set forth as follows:

|  | Example 7 | Example 8 |
|---|---|---|
| Type of ore used (gangue, TiO$_2$ ratio) | low | high |
| Amount of ore used (g.) | 300 | 400 |
| Amount of fluxing agents added: |  |  |
| CaO (g.) | 23 | 20 |
| MgO (g.) | 44 | 12 |
| Analysis (chemical) of slag produced: |  |  |
| TiO$_2$ (percent) | 66.5 | 65.9 |
| FeO (percent) | 5.2 | 1.2 |
| CaO (percent) | 8.4 | 9.5 |
| MgO (percent) | 17.2 | 11.0 |
| Gangue (percent) | 2.7 | 12.4 |
| Material having the structure of magnesium dititanate, MgO.2TiO$_2$ | 75 | 65 |
| Digestibility (percent) | 95 | 91 |
| Theoretical Composition (CaO—MgO—TiO$_2$ System): |  |  |
| TiO$_2$ (percent) | 71.0 | 76.3 |
| CaO (percent) | 9.3 | 11.0 |
| MgO (percent) | 19.7 | 12.7 |
| Designation number on Fig. 1 | 7 | 8 |

Example 9

Illustrating the preparation of a slag composition having good digestibility, but poor fluidity, having present in the reaction mixture a deficiency of lime, but adequate magnesia, MgO.

Composition of reaction mixture:
    Ore _____ 100 lbs.
    Petroleum coke __ 13.5 lbs.
    Magnesia _____ 4 lbs. (as present in the ore and added)
    Lime _____ 0.7 lb. (as present in ore)

The charge was melted in an electric arc furnace. It was not difficult to melt, but considerable bubbling indicated that for commercial operation, the procedure would be unsatisfactory. The heating was continued until the unreduced iron was about 6% of the weight of the slag. By this time, a thick crust had built up on the walls of the furnace consisting apparently largely of iron-magnesium dititanate. The furnace was tapped at this stage. The temperature of the slag was 1460° C. The slag contained about 71% TiO$_2$. Its microscopic analysis was as follows:

80–90% material having the structure of magnesium dititanate, MgO.2TiO$_2$
10% glassy phase, gangue
More than 1% but less than 5% metallic iron
No calcium titanate or ilmenite was present.

When tested for digestibility, upwards of 89% solubilized TiO$_2$ was obtained.

The above examples, numbers 1 to 9, show operation of the processes of this invention to produce a fluid slag form of concentrate from which the metallic iron is more or less readily separated by tapping. These examples include the addition of fluxes to the starting mixture. Such flux addition, however, is not essential in the process taken in its broadest aspects, and the following example, Example 10, illustrates production of a digestible concentrate from titaniferous iron ore by reduction at relatively high temperatures and in which no fluxing agents are added.

Example 10

The ilmenite ore employed had the following analysis:

| Constituent | Percentage |
|---|---|
| TiO$_2$ | 39.7 |
| Fe Oxides | 49.2 |
| CaO | 0.7 |
| MgO | 3.6 |
| Gangue | 6.8 |

60 grams of carbon (petroleum coke) were mixed with 400 grams of the ilmenite described above. This charge was heated in an induction furnace at a temperature of about 1450° C. until the iron oxide, FeO, content in the non-metallic portion of the mixture had been reduced to about 3%. The mixture, which now contained a substantial portion of metallic iron, was allowed to cool and was then crushed and the metallic iron mechanically separated from the titanium-containing concentrate. Analysis of the concentrate showed the following:

| Constituent | Percentage |
|---|---|
| TiO$_2$ | 77.6 |
| FeO | 3.1 |
| MgO | 6.9 |
| Gangue | 12.4 |
| Material having the structure of magnesium dititanate, MgO.2TiO$_2$ | 90 |

The digestibility of the TiO$_2$ in the so-formed concentrate was determined to be 92%.

An example of the operation of the process of this invention conducted at sintering temperature is as follows:

Example 11

800 grams of the ilmenite used in Example 10 was mixed with 120 grams of petroleum coke and the mixture was heated at a temperature of about 1300° C. until the iron oxide, FeO, content was reduced to about 5%. The sinter product was split into two portions, one of which was puddled while hot to collect the iron which was thus separated and the other portion was allowed to cool, was ground and the iron magnetically separated.

|  | Concentrate A—Puddled | Concentrate B—Magnetically separated |
|---|---|---|
| TiO$_2$ | 74.8 | 75.6 |
| FeO | 5.1 | 5.1 |
| MgO | 6.8 | 6.9 |
| Metallic Iron | 2.3 | .8 |
| Gangue | 11.0 | 11.6 |
| Material having the structure of magnesium dititanate, MgO.2TiO$_2$ | 90 | 90 |

Digestion tests of both Concentrate A and B showed digestibility of 90% in each case.

An example of the operation of the process of this invention at low temperatures, that is, generally between 1150° C. and about 1200° C. is as follows:

Example 12

800 grams of the ilmenite ore used in Example 11 was mixed with 120 grams of petroleum coke and the mixture was heated in a rotary furnace at a temperature of 1200° C. until the iron oxide, FeO, content of the mixture other than metallic iron was lowered to 15%. The product was composed of discrete particles in which the major portion of the iron oxide had been reduced to metallic iron. The product was then ground and split into two portions, one of which was leached with 10% ferric chloride solution which solubilized the metallic iron portion. The other portion was similarly leached with 5% sulphuric acid solution to remove the metallic iron and a major portion of the iron oxide content.

Analysis of the two concentrate products was as follows:

|  | Leached with FeCl₃ Concentrate A | Leached with H₂SO₄ Concentrate B |
|---|---|---|
| TiO₂ | 75.0 | 78.1 |
| FeO | 8.0 | 4.2 |
| MgO | 6.8 | 7.1 |
| Metallic iron | trace | trace |
| Gangue | 10.2 | 10.6 |
| Material having the structure of magnesium dititanate, MgO.2TiO₂ | 90 | 90 |

Digestibility of both concentrate products above was determined to be 92%.

It is interesting to note that the low temperature reduction according to this invention and illustrated in Example 12 produces the necessary material having the magnesium dititanate structure even though no fusion or sintering of the mixture takes place. The furnace charge remains, at all times, in the form of discrete particles in which the iron content may be reduced as heretofore explained and the magnesium dititanate structure formed. The production of material having the required magnesium dititanate structure occurs only when temperatures above 1150° C. are employed. Reduction carried on at temperatures below this, will result in effective reduction of the iron oxide to metallic iron but will not result in formation of the required amount of material having the magnesium dititanate structure. Therefore, concentrates produced at temperatures below 1150° C. will not be readily digestible and are not considered within the scope of the present invention.

From the foregoing, it will be seen that the novel compositions of the present invention are characterized by an appreciable content of crystals of magnesium dititanate structure corresponding to the formula MgO.2TiO₂ in which a certain amount of the magnesia may be isomorphously replace by iron. They are further characterized as containing a minimum amount of reduced magnesium titanate corresponding to the formula MgTi₂O₄ having roughly cubic crystal form as well as a minimum content of vitreous glassy phase.

Such compositions, as has been explained, are prepared according to the invention by reducing a titaniferous-iron raw material at elevated temperatures by means of a carbonaceous reducing agent and certain fluxing agents, particularly magnesia, to form the digestible magnesium dititanate and preferably also lime to impart fluidity, while at the same time controlling the amount of glass-forming constituents so that in the final composition, the glass-like phase or matrix is kept to a minimum, the reducing being carried out under such conditions that a small amount of iron is left unreduced in the final compositions.

Being readily digestible in strong sulphuric acid, the novel composition of the present invention is readily adapted for the manufacture of titanium dioxide pigments.

I claim:

1. As a new composition of matter a titaniferous concentrate derived from an ilmenite-containing ore, containing at least 55% TiO₂, iron oxide, FeO, in amount from 1% to 10% by weight and gangue in amount not more than 15% by weight, said concentrate being characterized by a content of at least 50% by weight of material having the X-ray structure of magnesium dititanate, MgO.2TiO₂, and by being digestible in strong sulphuric acid.

2. As a new composition of matter a titaniferous concentrate, derived from an ilmenite-containing ore, said concentrate containing TiO₂ in amount at least 55%, MgO and CaO in amount so that for each 100 parts of TiO₂ there are present from 18 to 54 parts of MgO and CaO taken together within which the MgO may vary from 4 to 34 parts and the CaO may vary from 10 to 40 parts, iron oxide, FeO, in amount from 1% to 10% by weight and gangue in amount less than 15% by weight of said concentrate being characterized by a content of at least 50% by weight of material having the X-ray structure of magnesium dititanate, MgO.2TiO₂, and by being digestible in strong sulphuric acid.

SANDFORD S. COLE.

REFERENCES CITED

The following references are of record in the file of this patent:

UNITED STATES PATENTS

| Number | Name | Date |
|---|---|---|
| 921,686 | Fitzgerald | May 18, 1909 |
| 2,256,536 | Udy | Sept. 23, 1941 |
| 2,294,895 | Drapeau, Jr. | Sept. 8, 1942 |
| 2,313,044 | Brassert | Mar. 9, 1943 |
| 2,476,453 | Peirce et al. | July 19, 1949 |